(12) United States Patent
Brothers

(10) Patent No.: US 6,523,789 B2
(45) Date of Patent: *Feb. 25, 2003

(54) COMPUTER MOUSE CABLE HOLDER

(76) Inventor: Douglas A. Brothers, 9116 Rockefeller La., Springfield, VA (US) 22153

( * ) Notice: Subject to any disclaimer, the term of this patent is extended or adjusted under 35 U.S.C. 154(b) by 0 days.

This patent is subject to a terminal disclaimer.

(21) Appl. No.: 09/882,880

(22) Filed: Jun. 15, 2001

(65) Prior Publication Data

US 2001/0030265 A1 Oct. 18, 2001

Related U.S. Application Data

(63) Continuation of application No. 09/186,625, filed on Nov. 6, 1998.

(51) Int. Cl.[7] ................................................. F16L 3/00
(52) U.S. Cl. ............................... 248/51; 248/58; 248/65
(58) Field of Search ........................... 248/51, 918, 58, 248/450, 458, 442.2

(56) References Cited

U.S. PATENT DOCUMENTS

| | | | | | |
|---|---|---|---|---|---|
| 2,554,176 A | * | 5/1951 | Edwards | .................... | 224/42.1 |
| 2,979,296 A | * | 4/1961 | Groocock | .................... | 248/51 |
| 5,044,593 A | * | 9/1991 | Jones | ....................... | 248/442.2 |

\* cited by examiner

Primary Examiner—Anita King
Assistant Examiner—A. Joseph Wujciak, III

(57) ABSTRACT

A flexible cable holder for releasably suspending a computer mouse cable from a location above the plane of a surface upon which the mouse is moved to provide an adjustable length of cable between the mouse and the holder. The cable holder comprises a body member including two end portions with a fastening mechanism disposed at one of the end portions for affixing the holder at a location above the plane of the surface upon which the mouse is moved during its operation, and a projecting body portion that extends generally horizontally and outwardly from the one end portion when affixing the holder with the fastening mechanism at a location above the plane of the surface upon which the mouse is moved. The projecting body portion includes a cable retaining mechanism disposed at the other end portion of the holder for releasably receiving and frictionally retaining a folded cable portion which is folded back upon itself. The cable retaining mechanism includes a top surface, a bottom surface, and a cable receiving aperture that extends through the top and bottom surfaces and has a size sufficient to receive and frictionally retain the folded-back cable portion in place with respect to the projecting means to maintain the adjustable length of the cable substantially constant between the mouse and the holder. The cable retaining mechanism is effective to allow the mouse to be freely moved during operation of the mouse without the adjustable length of the cable being subject to frictional drag and entanglement. The holder may include a tray for receiving and holding small articles and/or a slot for holding upright cards or photographs or other flat objects.

14 Claims, 9 Drawing Sheets

COMPUTER MOUSE CABLE HOLDER

Pursuant to 37 CFR 1.53(b), this is a continuation of U.S. application Ser. No. 09/186,625 filed Nov. 6. 1998.

FIELD OF THE INVENTION

This invention relates, in general, to a computer mouse cable holder and in particular, to a holder of simple construction and minimal parts for suspending the cable above the mouse.

The holder is designed to eliminate problems associated with the use of a computer mouse. Typically, a computer workstation will include a desk surface with a desktop computer, a keyboard, a mouse, a mouse pad, and a monitor. The desk surface often becomes crowded when papers are added thereto. In order to use a computer mouse, one must move the mouse from side to side and back and forth. The computer mouse cord or cable drags along the desk surface during these movements. The force of this frictional mouse cable drag is in addition to that amount of exertion normally required to move the mouse which adds to the fatigue of the user. Additionally, the mouse cable can become entangled with papers or other objects on the desk surface.

DESCRIPTION OF THE PRIOR ART

The computer mouse hook of U.S. Pat. No. 5,750,934 requires a heavy base to support a wire mast including an integral serpentine gripper through which is woven a mouse cable. The mouse hook occupies valuable space on the desk or table top, requires a large height space and has many parts.

The computer mouse cord holder and support of U.S. Pat. No. 5,398,895 requires a base which is screwed to a table top and an upright housing with a flexible, helical coil for encasing the cord. The cord holder damages the table top, takes up too much space and requires laborious "threading" of the cord through the cord holder.

The electrical cord holder device of U.S. Pat. No. 4,472,860 requires a plate with at least one flange projecting therefrom, and a coating of self-adhesive material thereon. Tile holder device is intended for mounting on wall molding and together with the wall surface forms a trough-like section for laying a cord therein. Resilient limbs or clips are used to retain a cord. The holder device is designed for electrical cords which are thick and stiff and are not intended to be moved. The cords are pushed laterally into channels defined by the limbs and clips for retention.

The display device of U.S. Pat. No. 3,178,138 requires a body of sheet material with fold lines and pole receiving holes or apertures that is foldable to support a pole of a sign at two spaced apart locations.

The mouse cord control device of U.S. Pat. No. 5,723,821 requires a vertical support member for elevating mouse cord engaging means above the mouse pad and a base member for attachment to the mouse pad.

The computer mouse support of U.S. Pat. No. 5,636,822 requires a platform upon which a mouse can be operated, the platform being slidably mounted on a bracket. The platform includes notches for the mouse cord and is adjustable for the user's comfort.

The lap supported computer mouse surface of U.S. Pat. No. 5,593,128 requires a platform with locating and retaining means and spaced posts adjacent to the edges for preventing escape of the mouse. It uses a slot to hold the mouse cord rather than a hole.

The mouse pad of U.S. Pat. No. 5,556,061 requires a base with a mouse receiving surface and a cord retainer for retaining a cord of a computer mouse. It uses a channel rather than a hole.

Although mouse cord or cable holding devices are known in the art, all of the prior art devices still suffer from major drawbacks and make use of slots and channels. The prior art devices raise only a small portion of the cord above the work surface. The mouse cord is not raised high enough off of the surface to eliminate frictional drag and prevent entangling. The prior art teaches or suggests that slots and channels are suitable devices for retaining mouse cords.

PURPOSE OF THE INVENTION

It is an object of the present invention to provide a holder which suspends a computer mouse cable high above the computer mouse to facilitate movement of the mouse.

It is a further object of the present invention to provide a holder which reduces the amount of force required to move the mouse horizontally.

It is a further object of the present invention to provide a holder which releasably grips a cable such that adjustments can be made without the use or need of tools.

It is a further object of the present invention to provide a holder which prevents tangling of a computer mouse cable.

It is a further object of the present invention to provide a holder which removes clutter from the work surface adjacent to a computer mouse.

It is a further object of the present invention to provide a holder which suspends a computer mouse cable in a substantially vertical orientation.

It is a further object of the present invention to provide a holder which is pivotally adjustable to suit the preference of the user.

It is a further object of the present invention to provide a holder which facilitates use by left-handed and right-handed users.

It is a further object of the present invention to provide a holder which provides a receptacle to receive small articles such as pens and pencils.

It is a further object of the present invention to provide a holder which displays cards or photographs or other flat objects and holds them upright.

It is a further object of the present invention to provide a holder which projects laterally and towards the user from its affixed surface.

It is a further object of the present invention to provide a holder which requires a minimum of height space.

THE SUMMARY OF THE INVENTION

The computer mouse cable holder makes use of the novelty of a folded cable held releasably in a hole. None of the prior art devices teach or suggest use of a hole to releasably retain a portion of a folded computer mouse cable such that the remaining portions of the cable extend downwardly away from the holder. Neither does it suggest or teach use of adjustable arms for a device to support or hold a computer mouse cable.

The present invention is directed to a holder for a computer mouse cable, in particular a holder that suspends a portion of the cable, prevents tangling of the cable and facilitates use of the mouse by eliminating drag and friction on the cable. The holder includes a body which may be straight or angled or adjustably jointed. The holder includes an aperture near at least one end adapted to releasably retain a portion of a cable which is folded back upon itself. The holder includes fastening means for affixing it to a surface or structure which is generally above the computer mouse. The holder optionally includes a tray for receiving and holding small articles and a slot for holding upright cards or photographs or other flat objects.

BRIEF DESCRIPTION OF THE DRAWINGS

Other objects of this invention will appear in the following description and appended claims, reference being made to the accompanying drawings forming a part of the specification wherein like reference characters designate corresponding parts in the several views.

DETAILED DESCRIPTION OF THE INVENTION

Figure 1:
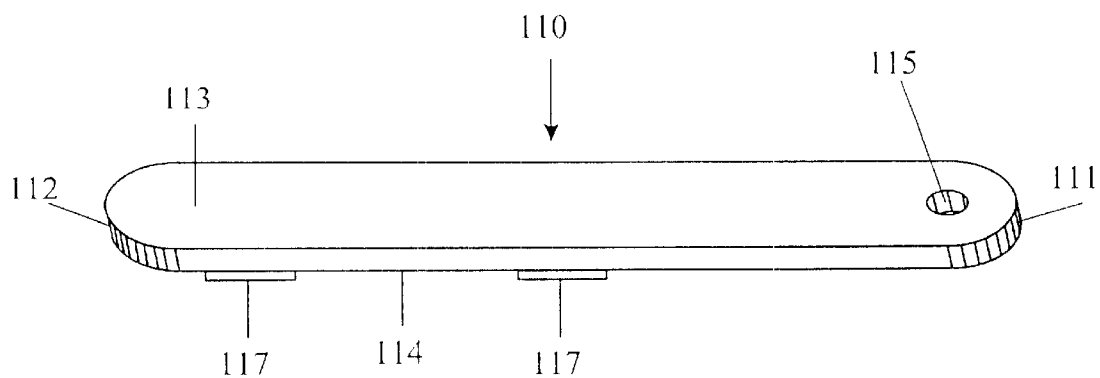
FIG. 1 is a top view of one embodiment of the holder of the present invention.

Referring now to the drawings in greater detail, FIG. 1 shows the holder 110 for a computer mouse cable or other computer input device. The holder 110 is elongate and includes a first end 111, a second end 112, a top surface 113 and a bottom surface 114. Near at least one of the ends, the holder 110 includes an aperture 115. The aperture is sized and adapted to engage and releasably retain a folded portion of a computer mouse cable or the like.

Figure 4:
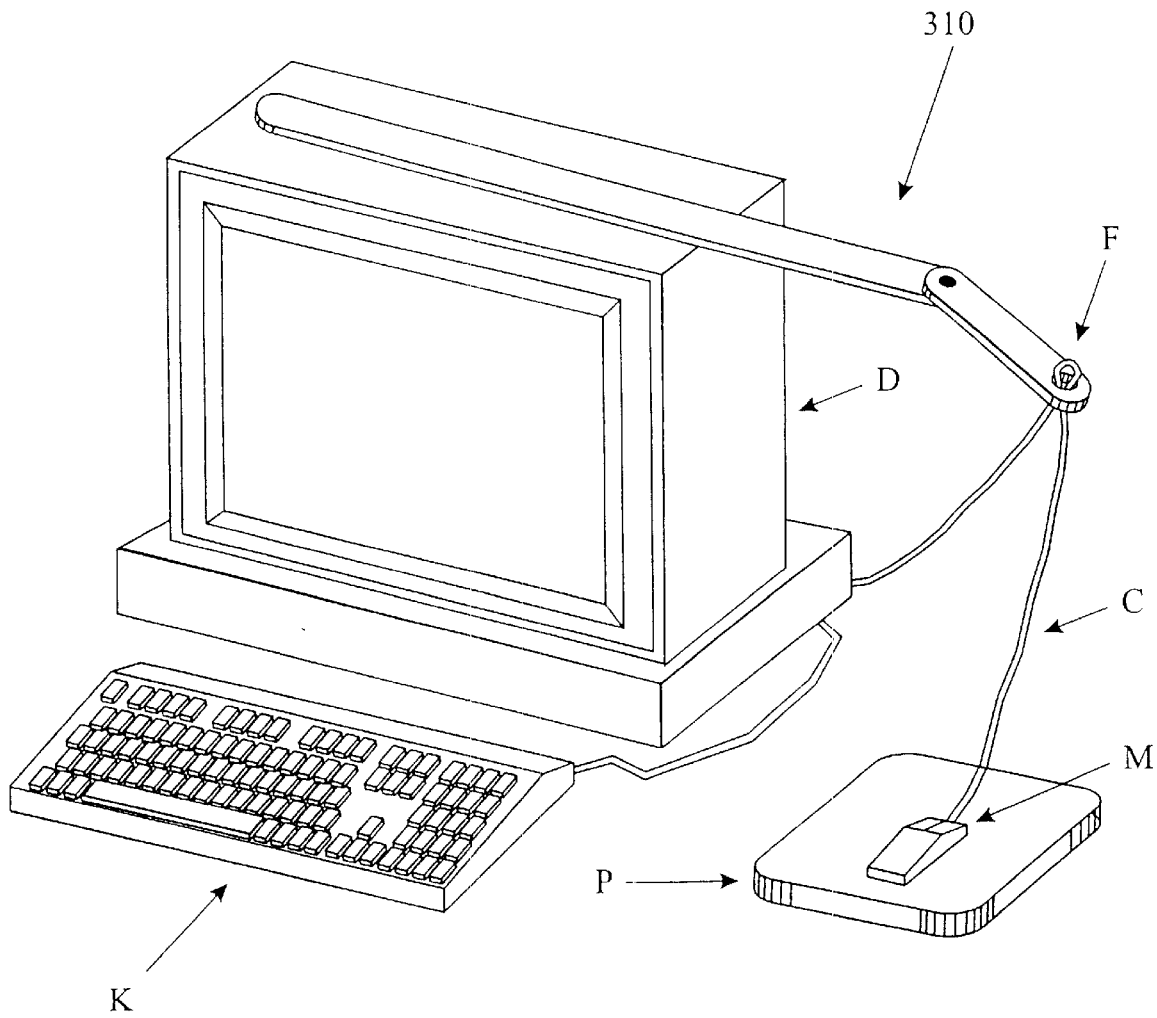
FIG. 4 is a perspective view of an embodiment of the present invention in use on a monitor and supporting a portion of a mouse cable.

In use, the holder supports a computer mouse cable in a manner similar to that shown in FIG. 4. The holder may be affixed or fastened to a computer display or monitor, a shelf or other structure which is generally above a support surface for the mouse or input device. Fastening means 117 such as double sided sticky tape or other adhesives, hook and loop fabric (for example, Velcro) and other known fastening devices may be employed to affix the holder to the structure.

Figure 2:
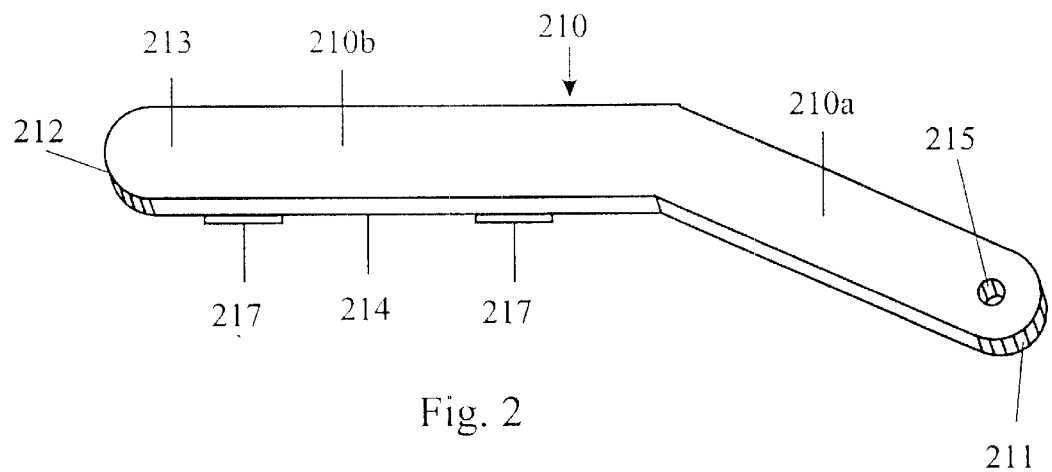
FIG. 2 is a top view of another embodiment of the holder showing an angled body portion.

FIG. 2 shows a second embodiment of the holder 210. The holder 210 includes a first body portion 210a which extends at an angle from a second body portion 210b. The holder 210 includes a first end 211, a second end 212, a top surface 213 and a bottom surface 214. The holder 210 includes at least one aperture 215 adapted to engage and releasably retain a folded portion of a cable. Fastening means 217 are shown attached to the holder 210. This holder allows the mouse cable to be positioned closer to the user.

Figure 3:
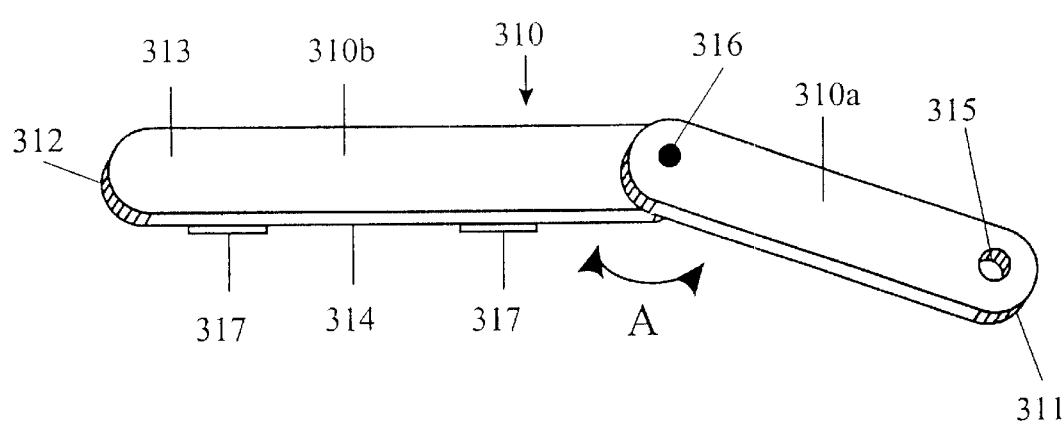
FIG. 3 is a top view of a third embodiment of the holder showing a pivotally connected body portion.

FIG. 3 shows a third embodiment of the holder 310 including a first body part 310a and a second body part 310b. The first body part 310a is pivotally attached to the second body part 310b at a pivot point 316. The body parts are movable with respect to each other about the pivot point 316 as indicated by the curved arrow A. The holder 310 is similar to the other embodiments and includes a first end 311, a second end 312, a top surface 313, a bottom surface 314, at least one aperture 315 and fastening means 317. This holder allows the cable to be adjustably positioned even after the holder is fastened by the fastening means. The user may reposition the aperture and thus the cable to be nearer or farther to suit his or her preference.

FIG. 4 shows holder 310 in use. The holder 310 is affixed to a computer display D and supports a folded portion F of a cable C. The cable is semi-rigid and tends to return to a straight line upon being folded and released. The folded cable is inserted into the aperture or hole in the arm. It remains in the hole and does not fall out because the section of the folded cable above the arm expands and becomes too large to transit the hole. The expansion is caused by two forces working together. The outer edges of the cable are stretched and the elasticity of the cable works to straighten out the fold. The inner edges of the fold are compressed and they push outwards and also tend to straighten the fold. As a consequence, the folded cable blossoms after transiting the hole and the fold is transformed from an inverted "U" shape into an inverted teardrop shape. Thus the folded cable is trapped by the hole. As is evident in the drawings and this description, the size of the hole is sufficient to receive and frictionally retain the folded cable portion in place with respect to the holder to maintain the adjustable length of the cable substantially constant between the mouse and the holder. The length of cable from the mouse to the holder may be adjusted in the following manner. To make minor adjustments to the length of cable between the mouse and the holder, the cable can be pushed into or pulled out from the aperture a little bit. To make major adjustments, the cable can be pulled free of the aperture and a selected portion of the cable can be folded and reinserted into the aperture. These adjustments are made manually without need of tools. A conventional keyboard K, mouse M, and mouse pad P are also shown.

Figure 5:
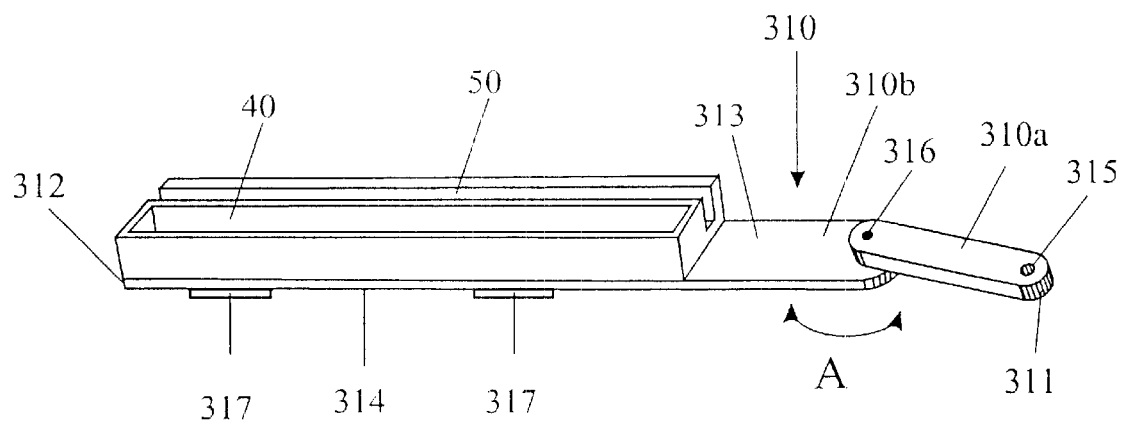
FIG. 5 is a perspective view of another embodiment of the present invention showing an optional tray and an optional slot.

FIG. 5 shows another embodiment of the holder 310 which includes a tray 40 for receiving pens, pencils, erasers or similar small articles that a user may desire. Also shown is an elongate slot or channel 50. The slot 50 is useful for holding upright cards, notes or pictures or other flat objects (not shown) which may be inserted therein by a user. The tray 40 and the slot 50 may be integrally formed in any one of the embodiments of the present invention. Alternatively, the tray 40 and slot 50 may be formed as separate parts and may be affixed to any of the embodiments.

Figure 6:
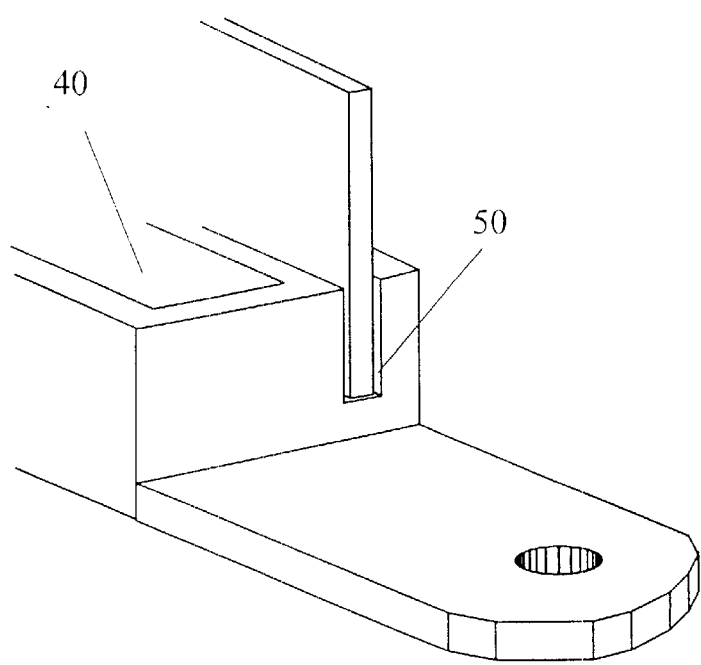
FIG. 6 is a fragmentary perspective view of another embodiment of the present invention showing a close-up detail of the tray and the slot.

FIG. 6 shows a detailed end view of a tray 40 and slot 50 with a flat object received in the slot. Body part 310a has been removed for clarity.

Figure 7:
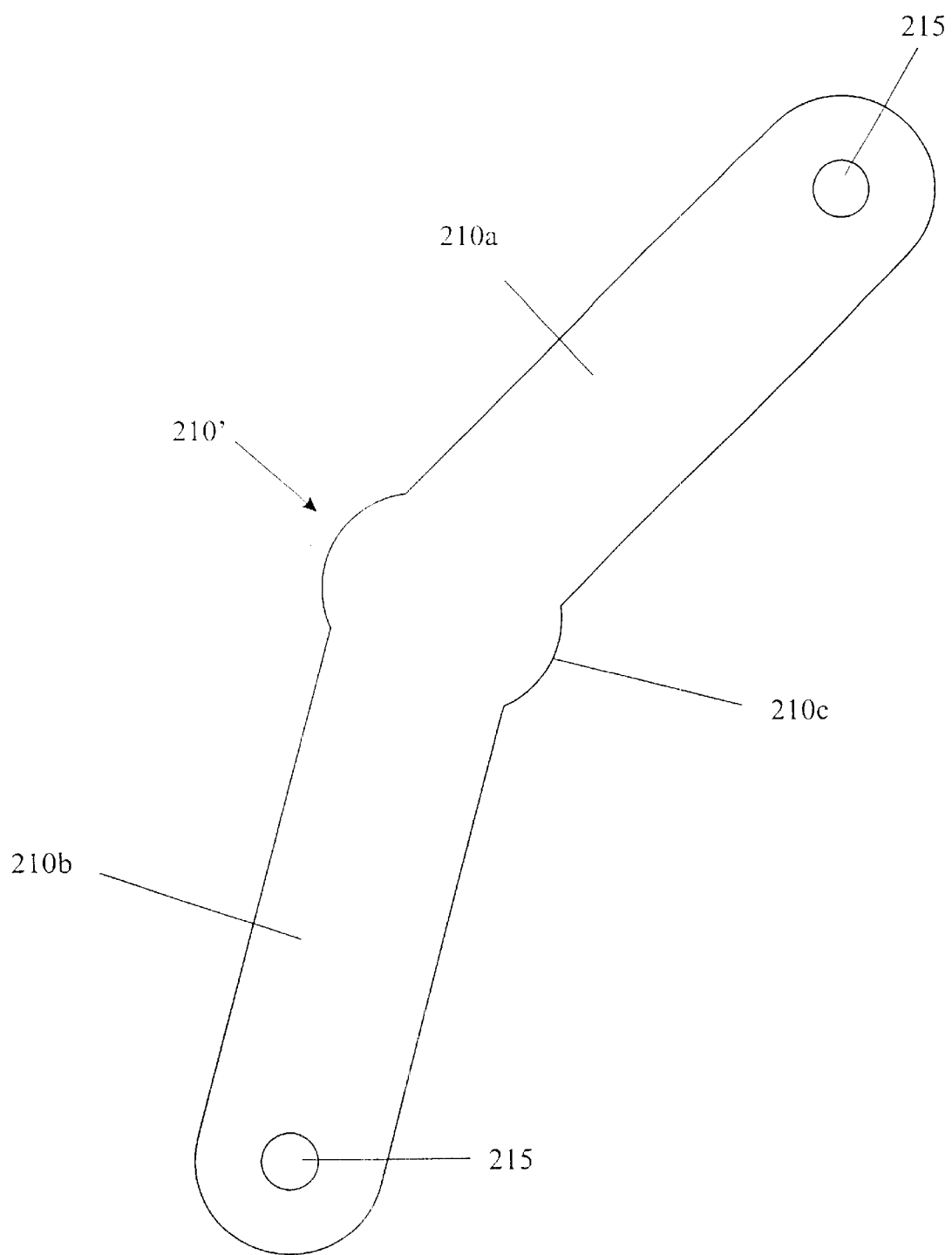
FIG. 7 is a top plan view of another embodiment of the present invention showing an angled body portion with bilateral symmetry and an aperture near each end for facile use by either right or left handed users.

FIG. 7 shows another embodiment of the holder 210'. The holder 210' includes first body portion 210a and second body portion 210b. A third body portion 210c provides increased stability. This embodiment of the holder is bilaterally symmetrical and includes an aperture or hole 215 near each end.

Figure 8:
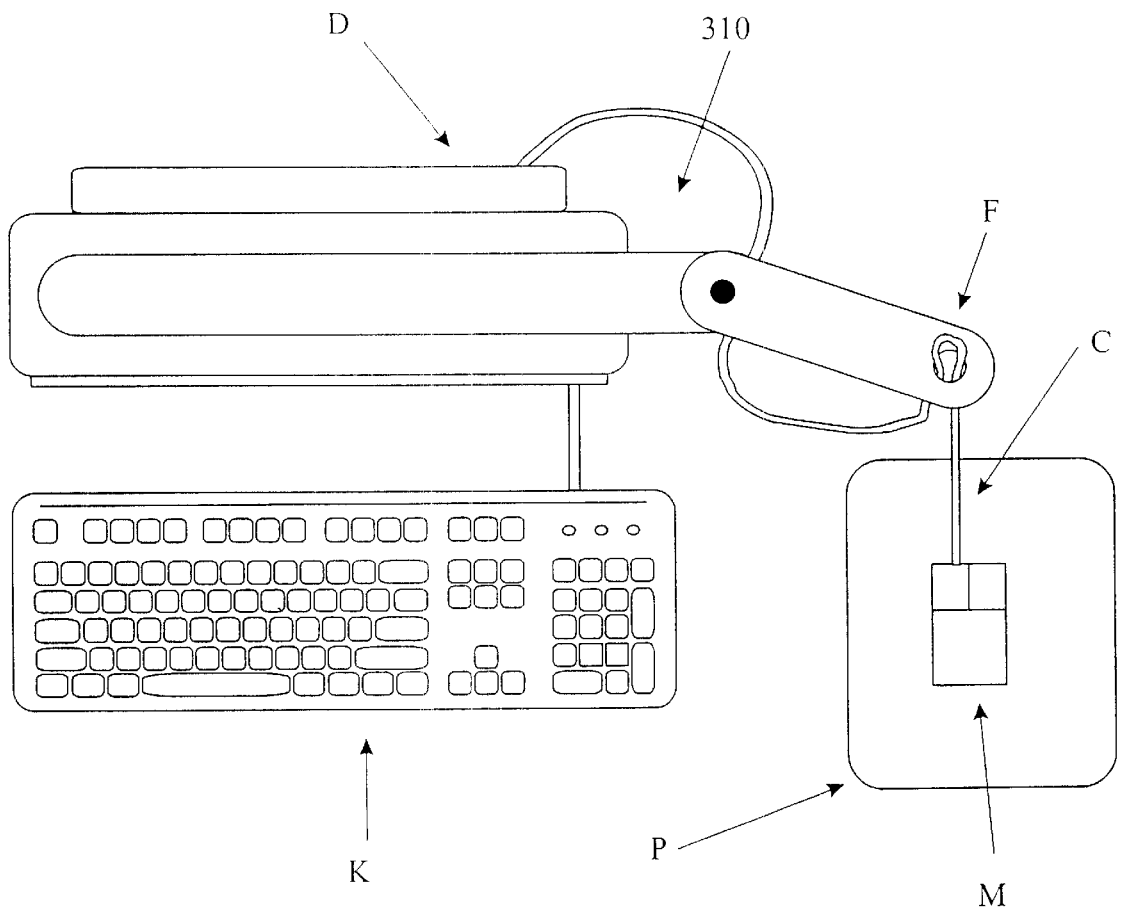
FIG. 8 is a top plan view of an embodiment of the present invention in use on a monitor and showing the location of the aperture and cable relative to the keyboard and mouse pad for a right handed user.

FIG. 8 shows a top view of the holder 310 in use with the hole positioned at the rear center of the mouse pad in a typical layout for a right handed user.

Figure 9:
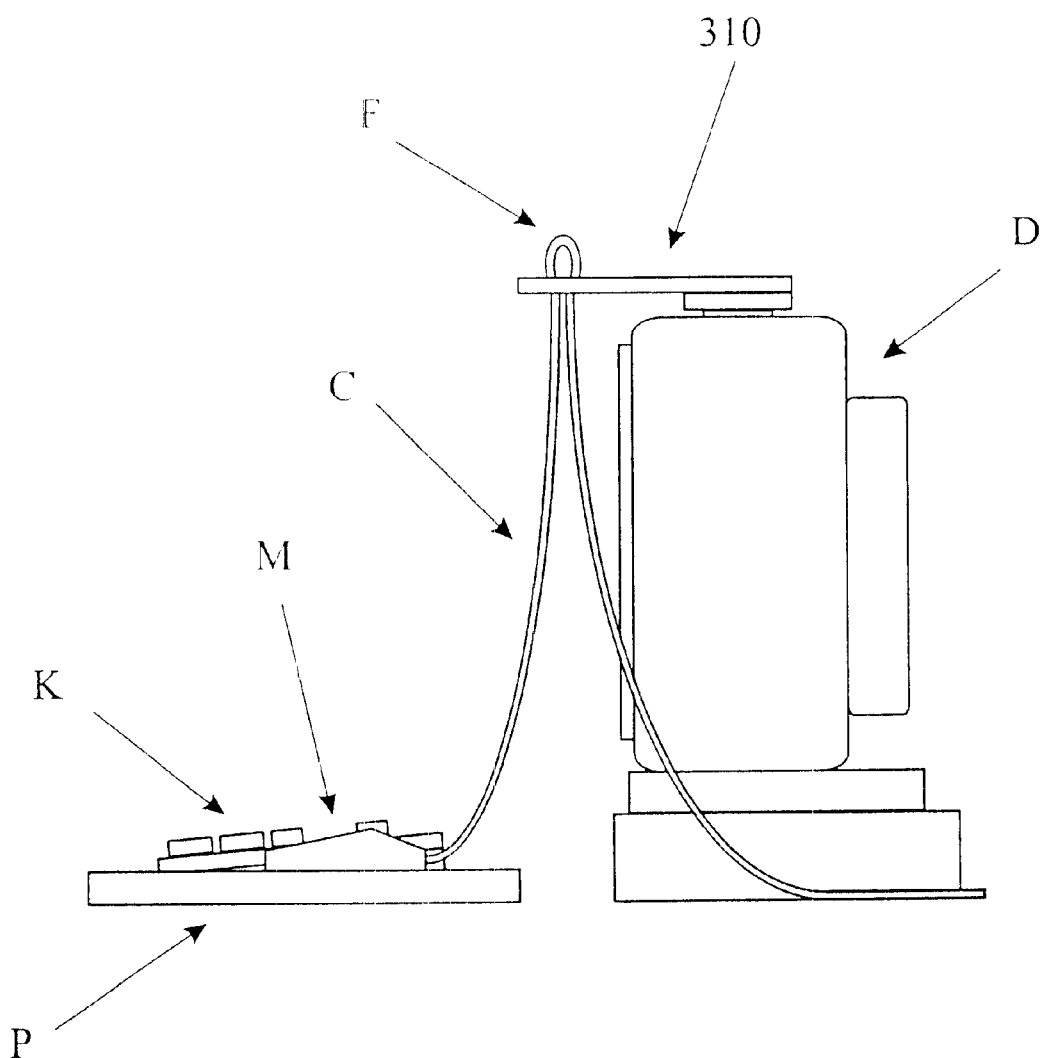
FIG. 9 is a side elevational view of the embodiment of the present invention shown in FIG. 8.

FIG. 9 shows a right side view of the holder 310 in use. The gentle curves induced in the suspended cable are clearly visible. The amount of the cable that rests on the work surface is minimal. The cable can be adjusted to be suspended such that the mouse will enjoy 360 degrees of freedom. When the cable is suspended, the mouse is free to move in any direction in a horizontal plane. This will completely eliminate any friction or hazard of kinking or tangling. There will be no friction on the cable since it would not touch the surface. It will not kink or resist the user since it is not held in a way that would induce kinks or allow tangles.

Figure 10:
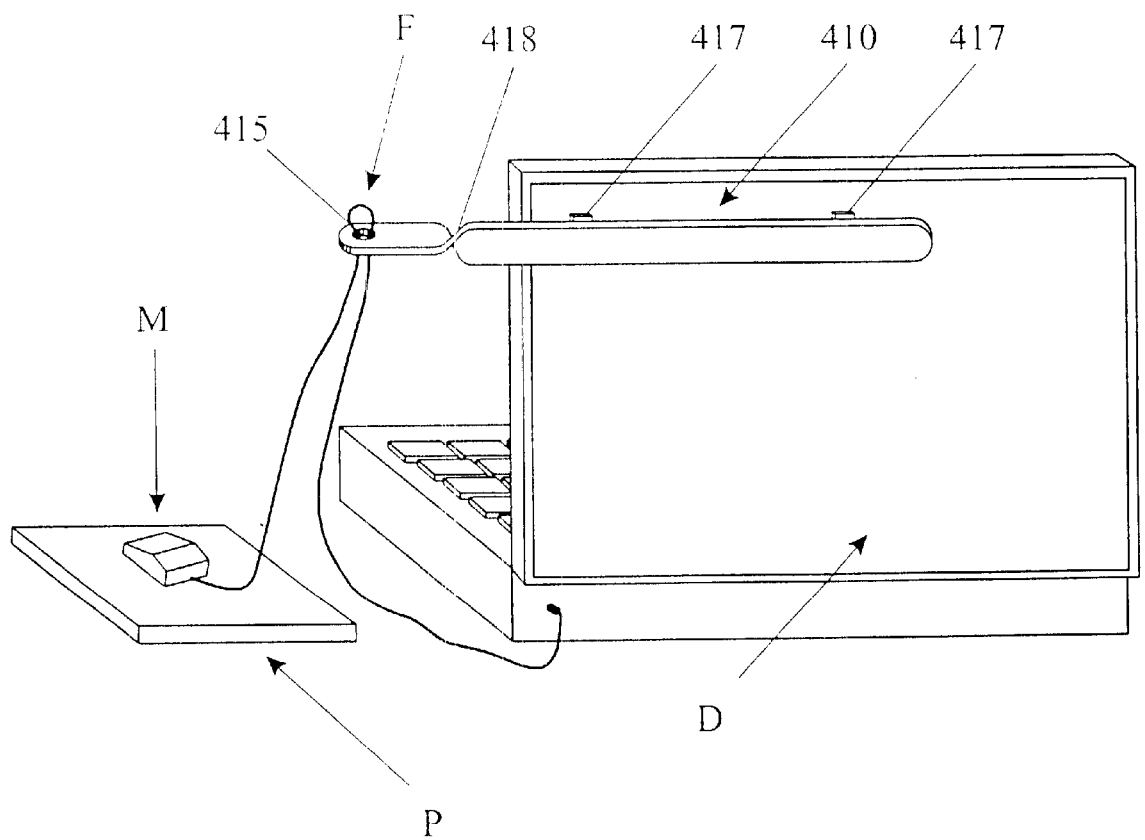
FIG. 10 is a perspective view of another embodiment of the present invention including a twist section in the body that is adjacent the aperture and particularly adapted for use with a portable computer.

FIG. 10 shows a real view of another embodiment of the holder 410 in use. The holder 410 is fastened to a generally vertical surface such as the upright rear surface of the display D of an opened portable computer. The holder 410 includes fastening means 417, an aperture 415 and a twisted portion 418. The holder 410 may be formed of a strip of metal with an approximately 90 degree twist. The angle of the support surface will determine the amount of twist.

Figure 11:
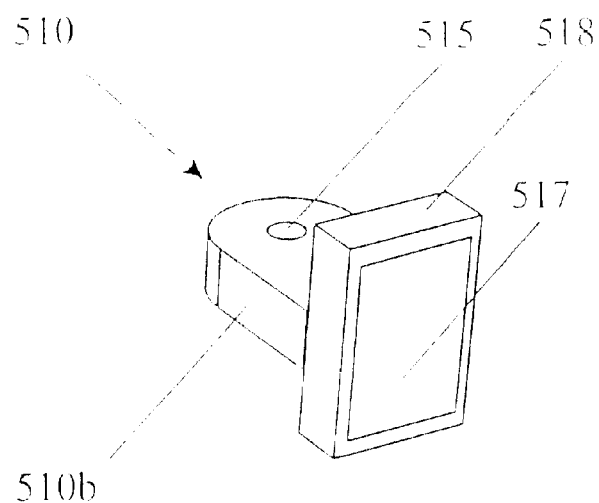
FIG. 11 is a perspective view of another embodiment of the present invention showing a shortened version including a flange portion and fastening means at an end distal to the aperture for mounting on a generally vertical surface above the mouse.

FIG. 11 shows a holder 510 including a flange portion 518 and fastening means 517 at an end of the body part 510b distal to the aperture 515 for mounting on a generally vertical surface above the mouse. As is evident from the drawings, flange portion 518 includes a flat attaching surface extending in a single plane upon which fastening means 517 is disposed. The attaching surface thus extends in a direction transverse to the projecting body part 510b and fastening means 517 includes means for affixing the flat attaching surface to a flat support surface.

Figure 12:
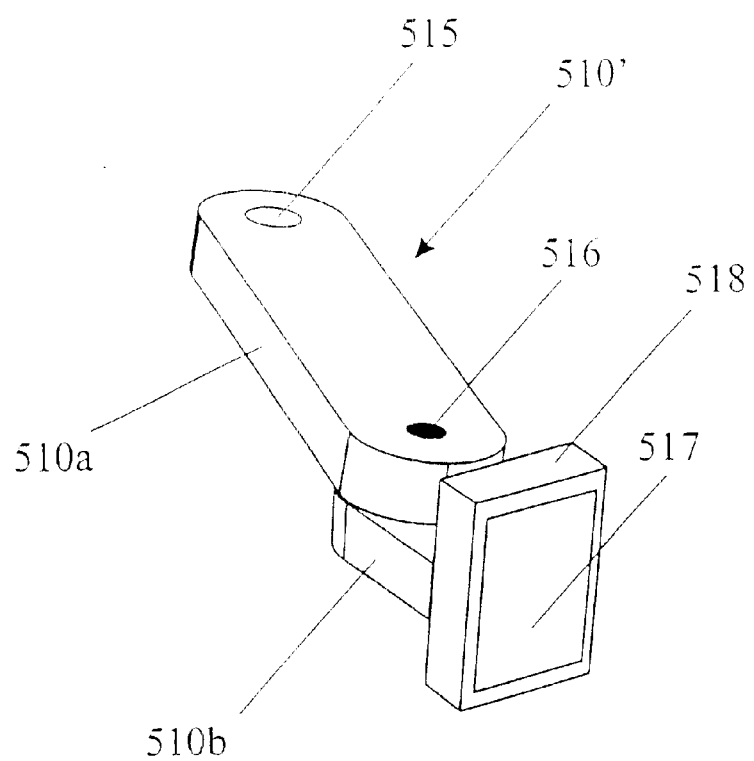
FIG. 12 is a perspective view of another embodiment of the present invention showing a shortened version with a pivotally adjustable arm including a flange portion and fastening means at an end distal to the aperture.

FIG. 12 shows a holder 510' including an adjustable body part or arm 510a pivotally connected to a body part 510b at pivot point 516. The holder 510' includes a flange portion 518 and fastening means 517 at an end distal to the aperture 515.

Figure 13:
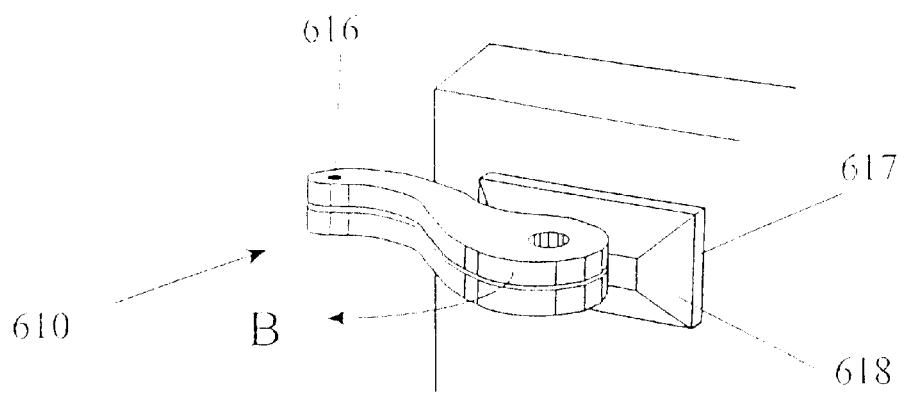
FIG. 13 is a perspective view of another embodiment of the present invention including S-curved arms in a closed position.
Figure 14:
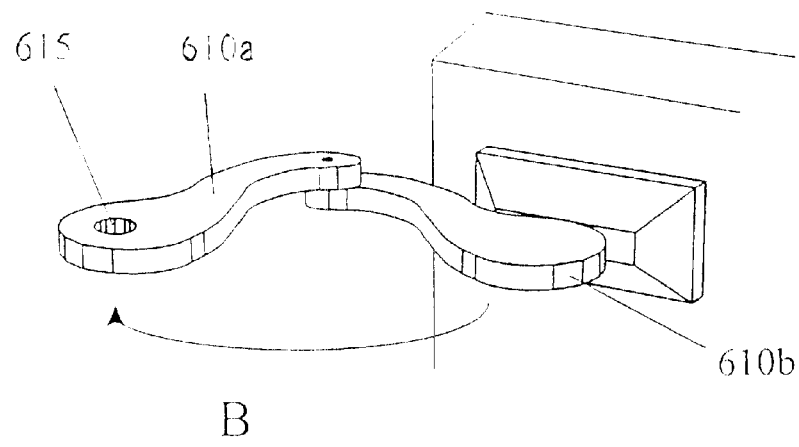
FIG. 14 is a perspective view of the embodiment of FIG. 13 showing the S-curved arms in a partially extended position.
Figure 15:
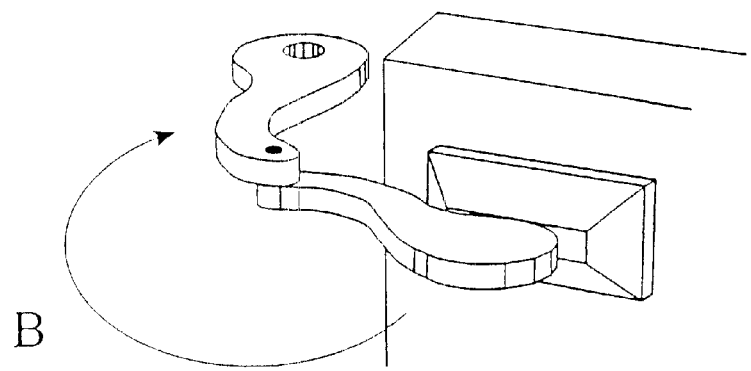
FIG. 15 is a perspective view of the embodiment of FIG. 13 showing the S-curved arms in an extended position.

FIGS. 13–15 show a view of another embodiment of the holder 610 in closed, partially extended and extended positions, respectively. The holder 610 includes S-curved arms 610a, 610b which are pivotally connected at pivot point 616. Arm 610a includes an aperture 615 and arm 610b includes flange 618 and fastening means 617.

The holder can be formed from any suitable material including wood, metal and plastic.

The pivotal connection may be freely pivotal or it may include features to retard pivotal motion such as a friction washer or detents.

Although the holder and the method of using the same according to the present invention has been described in the foregoing specification with considerable details, it is to be understood that modifications may be made to the invention which do not exceed the scope of the appended claims and modified forms of the present invention done by others skilled in the art to which the invention pertains will be considered infringements of this invention when those modified forms fall within the claimed scope of this invention.

Having thus set forth and disclosed the nature of this invention, what is claimed is:

1. A flexible cable holder for releasably suspending a computer mouse cable from a location above the plane of a surface upon which the mouse is moved to provide an adjustable length of cable between the mouse and the holder, said cable holder comprising:

(a) a body member including two end portions with fastening means disposed at one of said end portions for affixing the holder at a location above the plane of said surface upon which the mouse is moved during its operation, and (b) projecting means for extending generally horizontally and outwardly from said one of said end portions when affixing the holder with said fastening means at a location above said plane of said surface upon which the mouse is moved, (c) said projecting means including aperture means disposed at the other said end portion of the holder for releasably receiving a folded cable portion which is folded back upon itself to be frictionally retained in place with respect to the projecting means to maintain said adjustable length of the cable substantially constant between the mouse and the holder, (d) said aperture means being effective to allow said mouse to be freely moved below said projecting means during operation of the mouse without said adjustable length of the cable being subject to frictional drag and entanglement when the mouse is moved across said surface.

2. A flexible cable holder as defined in claim 1 wherein said two end portions are disposed along a longitudinal axis of the body member.

3. A flexible cable holder as defined in claim 1 wherein one of said two end portions of the body member is disposed along a first directional axis and the other of said-end portions is disposed along a second directional axis that is at an angle with respect to said first directional axis.

4. A flexible cable holder as defined in claim 1 wherein said body member includes means for receiving and holding small articles.

5. A flexible cable holder as defined in claim 4 wherein said receiving and holding means includes slot means for holding flat objects in an upright position.

6. A flexible cable holder as defined in claim 4 wherein said receiving and holding means includes tray means for holding writing instruments.

7. A flexible cable holder as defined in claim 1 wherein said aperture is effective to enable said cable portion to be inserted from said bottom surface through said top surface, and said length of cable beneath said projecting means is adjustable by controlling the amount of folded-back cable portion that extends through said aperture.

8. A flexible cable holder as defined in claim 1 wherein said two end portions are disposed in a horizontal plane and at an angle with respect to each other.

9. A flexible cable holder as defined in claim 1 wherein said aperture is effective to enable said cable portion to be inserted from said bottom surface through said top surface, said length of cable beneath said projecting means is adjustable by controlling the amount of folded-back cable portion that extends through said aperture, and said projecting means includes a twisted portion whereby said holder is effective to extend from a generally vertical support surface to which the holder is affixed with said fastening means.

10. A flexible cable holder as defined in claim 1 wherein an end portion of said holder includes an arcuate section.

11. A flexible cable holder for releasably suspending a computer mouse cable from a location above the plane of a surface upon which the mouse is moved to provide an adjustable length of cable between the mouse and the holder, said cable holder comprising:

(a) a body member including a center section and two end portions, each end portion including first and second projecting means for extending generally horizontally and outwardly in first and second directions from the center section, and (b) means disposed at said center section for fastening the holder at a location above the plane of said surface upon which the mouse is moved during its operation, (c) each said projecting means including aperture means disposed at each of said end portions of the holder and including an aperture having a size effective to releasably receive and frictionally retain a folded cable portion which is folded back upon itself, (d) said projecting means including a top surface and a bottom surface, and said aperture extends through said top and bottom surfaces, and said aperture is further effective to maintain said adjustable length of the cable substantially constant between the mouse and the holder, (e) said aperture means being effective to allow said mouse to be freely moved below said projecting means when frictionally retaining said folded-back cable portion when the mouse is moved along said surface without said adjustable length of the cable being subject to frictional drag and entanglement.

12. A flexible cable holder for releasably suspending a computer mouse cable from a location above the plane of a surface upon which the mouse is moved to provide an adjustable length of cable between the mouse and the holder, said cable holder comprising:

(a) two end portions with fastening means disposed at one of said end portions for affixing the holder at a location above the plane of said surface upon which the mouse is moved during its operation, and (b) projecting means for extending generally horizontally and outwardly from said fastening means when affixing the holder at a location above said plane of said surface upon which the mouse is moved, (c) said projecting means including cable retaining means disposed at the other said end portion of the holder for releasably receiving and frictionally retaining a folded cable portion which is folded back upon itself, said cable retaining means being effective to maintain said adjustable length of the cable substantially constant between the mouse and the holder, (e) said cable retaining means being further effective to allow said mouse to be freely moved along said surface below said projecting means without said adjustable length of the cable being subject to frictional drag and entanglement, (f) means pivotally connecting said projecting means to said fastening means for swinging said projecting means in a generally horizontal plane when the cable holder is affixed at a location above the plane of said surface upon which the mouse is moved.

13. A flexible cable holder as defined in claim 12 wherein said fixed projection portion and said adjustable projection portion each having an arcuate section and said aperture is disposed at an outer end portion of the adjustable projection portion.

14. A flexible cable holder for releasably suspending a mouse cable from a location above the plane of a surface upon which the mouse is moved to provide an adjustable length of cable between the mouse and the holder, said cable holder comprising:

(a) two end portions with fastening means disposed at one of said end portions for affixing the holder at a location above the plane of said surface upon which the mouse is moved during its operation, and (b) projecting means for extending generally horizontally and outwardly from said fastening means when affixing the holder above said plane of said surface upon which the mouse is moved, (c) said projecting means including cable retaining means disposed at the other said end portion of the holder for releasably receiving and frictionally retaining a folded cable portion which is folded back upon itself, (d) said cable retaining means including a top surface, a bottom surface, and an aperture that extends through said top and bottom surfaces, said aperture having a size sufficient to receive and frictionally retain said folded cable portion in place with respect to the projecting means to maintain said adjustable length of the cable substantially constant between the mouse and the holder, (e) said cable retaining means being effective to allow said mouse to be freely moved along said surface below said projecting means when said mouse is in use without said adjustable length of cable beneath said projecting means being subject to frictional drag and entanglement, (f) said fastening means including a flat attaching surface extending in a single plane and in a direction transverse to the projecting means, said fastening means further including means for affixing said flat attaching surface to a flat support surface.

* * * * *